US011885703B2

(12) United States Patent
Song et al.

(10) Patent No.: US 11,885,703 B2
(45) Date of Patent: Jan. 30, 2024

(54) MONITORING BOLT TIGHTNESS USING PERCUSSION AND MACHINE LEARNING

(71) Applicant: University of Houston System, Houston, TX (US)

(72) Inventors: Gangbing Song, Pearland, TX (US); Qingzhao Kong, Houston, TX (US); Siu Chun Michael Ho, Sugar Land, TX (US); Furui Wang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 637 days.

(21) Appl. No.: 17/051,476

(22) PCT Filed: Apr. 24, 2019

(86) PCT No.: PCT/US2019/028896

§ 371 (c)(1),
(2) Date: Oct. 29, 2020

(87) PCT Pub. No.: WO2019/212822

PCT Pub. Date: Nov. 7, 2019

(65) Prior Publication Data

US 2021/0231515 A1    Jul. 29, 2021

Related U.S. Application Data

(60) Provisional application No. 62/664,366, filed on Apr. 30, 2018.

(51) Int. Cl.
*G01N 29/04* (2006.01)
*G01L 5/24* (2006.01)
*G06N 5/04* (2023.01)
*G06N 5/01* (2023.01)

(52) U.S. Cl.
CPC ............... *G01L 5/246* (2013.01); *G06N 5/01* (2023.01); *G06N 5/04* (2013.01)

(58) Field of Classification Search
CPC ....... G01N 29/045; G01N 29/12; G01N 29/46
See application file for complete search history.

(56) References Cited

U.S. PATENT DOCUMENTS

2017/0160238 A1* 6/2017 Etoh ...................... G01N 29/46

* cited by examiner

*Primary Examiner* — Lam S Nguyen
(74) *Attorney, Agent, or Firm* — Jackson Walker LLP

(57) ABSTRACT

The systems and methods described herein are for monitoring the tightness of bolts. The systems and methods may be used with a mechanism to apply a percussive tap and with a recording or monitoring device for detecting and recording the acoustic signals that are generated by the percussive tap. The acoustic signals generated by percussive taps applied to bolts in various looseness states are analyzed and a machine learning model is developed that allows for determining bolt looseness based on the acoustic signals.

4 Claims, 5 Drawing Sheets

FIG. 6

| | Accuracy |
|---|---|
| 1 | 0.9400 |
| 2 | 0.9800 |
| 3 | 1 |
| 4 | 1 |
| 5 | 0.9600 |
| 6 | 1 |
| 7 | 0.9600 |
| 8 | 1 |
| 9 | 0.9800 |
| 10 | 0.9800 |
| ... | ... |
| 91 | 1 |
| 92 | 0.9600 |
| 93 | 0.9800 |
| 94 | 0.9200 |
| 95 | 1 |
| 96 | 0.9800 |
| 97 | 0.9800 |
| 98 | 0.9600 |
| 99 | 1 |
| 100 | 0.9200 |

MONITORING BOLT TIGHTNESS USING PERCUSSION AND MACHINE LEARNING

This application claims priority to U.S. Provisional Patent Application Ser. No. 62/664,366, filed Apr. 30, 2018, entitled "Monitoring Bolt Tightness Using Percussion and Machine Learning." the entire contents of which are hereby incorporated by reference.

BACKGROUND

This disclosure pertains to measuring and monitoring the load applied to bolts, particularly bolts intended for use in harsh environments.

Bolted joints are among the most common building blocks used across different types of structures, and are often the key component that sews all other structural parts together. From small, mundane devices to large critical infrastructure, the bolt is used to provide structural integrity in an inexpensive and efficient manner. Estimated to have existed for over half a millennium, the bolted connection has become one of the fundamental building blocks of modern manmade structures. Often together with a nut, the bolted connection clamps two larger components together, and together with a system of nuts and bolts, a large structure can be constructed. Critical structures, including bridges, aircraft, and spacecraft, rely on bolted connections to maintain structural integrity and functionality. Ideally, the connection lasts at least throughout the service life span of the structure, however, many factors contribute to the accelerated deterioration of the bolt connection. Most commonly, the repeated loading (e.g. due to vibrations) of the connection loosens the connection and reduces the integrity of the structure often without noticeable symptoms. Monitoring and assessment of looseness in bolted structures is one of the most attractive topics in mechanical, aerospace, and civil engineering.

A variety of methods have been reported to help monitor the status of the connections. In terms of bolt longevity, the most important parameter to be monitored is the axial load, or preload, experienced by the bolt. The preload is equivalent to the clamping force provided by the bolt to compress two components together, and is controlled through the application of torque onto the bolt. As the torque is applied to the bolt head or the nut, the bolt head and nut tends to get closer, thus elongating and tensioning the bolt body and at the same time increasing the clamping force on the structure. Without the right amount of preload, the bolted connection will become more vulnerable to failure. Multiple methods have been reported to indirectly determine the strength of a bolt connection.

A major group of bolt monitoring methods ae based on acoustic/vibration principles. In acoustic-elastic methods, the response of the bolt to different acoustic inputs are measured (i.e. time of flight through the bolt). Depending on the load of the bolt, its response to acoustic excitation varies predictably. In the active sensing method, piezoelectric actuator and sensor pairs are used to transmit and receive signals, respectively. The strength of the signal (i.e. the energy of the signal) is correlated to the characteristics of the interface between the bolt and the structure. With higher preloads, there is more micro-contact between the bolt and the structure, thus allowing stronger propagation of signals between the actuator and sensor. Higher signal strength can therefore be used to estimate the preload of the bolt. Attenuation of individual frequency components in the signal can be further examined for more details about the structure, albeit at a higher signal processing cost. Recent research in this area has demonstrated the use of time reversal techniques to further improve measurement capabilities. A related branch of research utilizes the change in the impedance of piezoelectric transducers mounted on or near the bolt. In the impedance method, the piezoelectric transducer is excited at a range of frequencies. The excitation generates vibrations in the structure, which in turn affects the impedance of the piezoelectric transducer. Changes in the structure, such as bolt tightening or loosening, can then be estimated by changes in the transducer impedance. The impedance method has been demonstrated in a range of cases. While acoustic monitoring has demonstrated the ability to detect changes in the status of the bolt connection, the user needs to overcome the challenges of mounting fragile piezoelectric elements in harsh environments, and the need for costly, sophisticated equipment and power to operate the transducers.

Another growing group of monitoring methods rely on visual parameters. Most simply a mark can be made on the bolt and its immediate surroundings. Relative movement between the two marks indicate possible bolt loosening. However, if manual bolt examination is not practical or possible, image processing methods can be used. Earlier literature demonstrated the monitoring of the optical speckle pattern on the side of a washer as the bolt was tightened or loosened. Another method monitored a coating of $SrAl_2O_4$: Eu, which exhibited changing elastic-luminesence properties as the bolt was tightened. More recent research rely on the use of digital images that can be acquired through conventional cameras, such as on a smart phone. The Hough transform was used in a report to measure the rotation of nuts based on such digital images. While working well with hexagonal nuts, the method depends on the ability of the processing algorithm to capture changes in image features, which may be more difficult for nuts and bolts of smoother shapes. Thus, research into the area has begun to consider the integration of machine learning techniques to assist in recognizing bolt loosening over a broader range of situations. As image based methods are noncontact, they possess an advantage of not requiring structural modifications to the bolt. However, image based methods are highly dependent on the photograph's quality including the lighting, angle, and texture of the connection. On the other hand, research in image-based bolt monitoring is quite new and significant advances are expected in the near future.

The most direct method to know the integrity of a bolted connection is to measure the load or strain of the bolt. In order to measure the load, a load cell in the shape of a washer may be used to measure the preload of the bolt. The user of the load measuring washer may need to be wary of size limitations. Direct measurement of the bolt strain can be accomplished through any methods that can measure bolt elongation. Most simply, a caliper can be used to measure the length of the bolt; however, while this measurement method works in controlled situations, it is impractical for large arrays of bolts. For higher accuracy, a strain gauge may be mounted along the length of the bolt, sometimes necessitating the grinding away of a portion of the threads. In most cases, an externally mounted strain gauge may not be practical, especially for long term use in harsh environments. Thus for high accuracy and practicality, a force or strain sensor may be embedded inside the bolt. An early implementation of such a method is the embedment of an electrical strain gauge into the center of the bolt via a narrow cavity. Embedded strain gauge inserts for bolts and for other types of connective devices are now commercially available.

While embedded strain gauges can effectively measure the preload of the bolt, the large cavity needed to contain the strain gauge limits the application to large bolts. The strain gauge and its associated apparatus can be bulky and vulnerable to many environmental disturbances, such as temperature, which will necessitate an extra compensating strain gauge and thus occupy more space.

SUMMARY

The present disclosure relates generally to systems and methods for monitoring the tightness, or looseness, of bolts.

In particular, the present disclosure relates to a percussion-based non-destructive approach to determine the health condition of bolted joints. Due to the different interfacial properties among the bolts, nuts and the host structure, bolted joints can generate unique sounds when excited by impacts, such as from tapping.

The concept of using sound as a diagnostic tool for human health has been around since ancient times. Illness can interfere with functions of a healthy organ and in certain cases alter the sounds normally produced by the organ. For example, pleural effusion, where fluids fill the pleural space surrounding the lungs, can prevent the generation of the normal breathing sounds associated with a healthy lung. By tapping the chest of a patient suffering from pleural effusion, a dull sound is heard instead of a hollow, resonant sound due presence of fluids. Such techniques were formalized into medicine by Leonard Auenbrugger in 1761 under the labels of auscultation (passive listening) and percussion (active listening). Percussion and auscultation are thus among the oldest methods used in clinical examinations to diagnose the health of patients.

In percussion, the dynamic properties of the anatomical structures are excited by the injection of energy in the form of tapping by the physician. In engineering terms, the dynamic excitation (e.g. via impact) of a structure under different mechanical states can produce frequency signatures correlated to unique health conditions. Such a method to ascertain health conditions is paralleled by similar percussive techniques used by engineers to inspect the integrity of various structures (i.e. railroads, bolts, and others). Personnel experienced in listening to the sound produced by impacts can determine the presence of structural abnormalities simply by listening with his or her own ear. However, reliance on the human hearing system to process sound for structural information is met with several obstacles. The human auditory range is roughly within 20 Hz-20 kHz depending on the individual, and the sound must be loud enough to be heard. Furthermore, the listener may require years of experience to distinguish subtleties in the sound that may point to hidden, underlying structural problems. While these obstacles have partly been solved through the use of acoustic devices such as ultrasonic transducers and acoustic emission sensors, there is still a drawback of requiring installation or at least close, sustained contact of the transducer with the inspected structure. Furthermore, the use of ultrasonic or acoustic emission testing devices will require specialized training and possibly years of experience in order to be used to their fullest potential. On the other hand, with the introduction of robotics and machine learning, such obstacles may be overcome.

The present disclosure relates to monitoring bolt looseness conditions by examining the impact-induced sound of a bolt. The method is similar to the percussive diagnostic techniques used in clinical examinations to diagnose the health of patients. By tapping on a bolted joint, the joint generates unique sounds depending on its degree of looseness. When combined with machine learning, the present method allows for the efficient inspection and determination of the health of the bolted joints of various structures.

Currently available technologies for bolt looseness monitoring mainly include ultrasonic-based detection, piezoelectric impedance-based measurement, fiber optic sensor-based measurement, and structural dynamic analysis. The existing technologies require the sensors to be constant contact with the bolted joint or its host structure. In addition, the existing technologies are sensitive to the particular bolt type as well as the geometry of the host structure, which may limit those technologies for in-situ application. The current system and method can be easily implemented with robotics to produce a cyber-physical system that can automatically inspect and determine the health of a structure in the field. A decision tree model can be trained from the training data to provide a flexibility of the method for inspecting different types of the bolts.

BRIEF DESCRIPTION OF THE DRAWINGS

FIG. 6 shows accuracy percentage of test data obtained using an exemplary decision tree model to identify bolt looseness from acquired impact data repeated 100 times.

DETAILED DESCRIPTION OF PREFERRED EMBODIMENTS

The present disclosure relates to systems and methods for monitoring the tightness of bolts. In preferred embodiments, the systems and methods utilize percussion and machine learning.

The present systems and methods can be used in preferred embodiments in any conditions, including in difficult to reach bolted connections. In preferred embodiments, the systems may be used with a mechanism to apply a percussive tap and with a recording or monitoring device for detecting and recording the acoustic signals that are generated by the percussive tap. In further preferred embodiments, the acoustic signals generated by percussive taps applied to bolts in various looseness states are analyzed and a machine learning model is developed that allows for determining bolt looseness based on the acoustic signals. In additional preferred embodiments, the systems and methods are used in conjunction with a monitoring application to provide initial data and long-term data regarding the tightness of each bolt.

Figure 1:
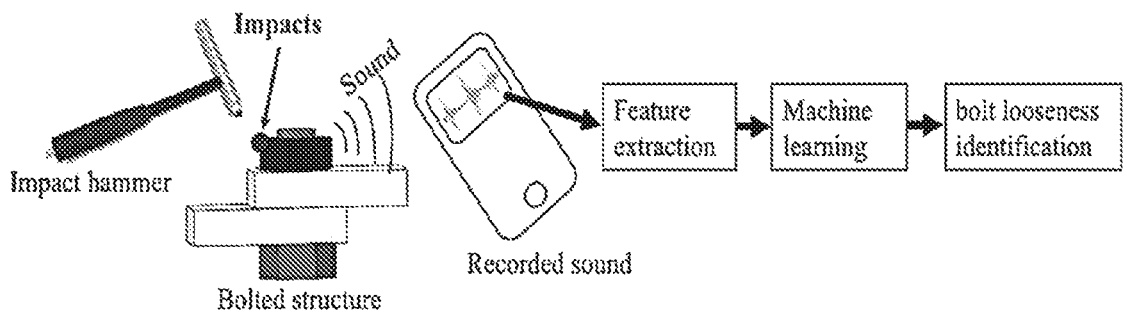
FIG. 1 shows a schematic and a flow chart of a preferred embodiment of the present method.

FIG. 1 shows a schematic and a flow chart of a preferred embodiment of the present method. Percussion is performed on the bolted structure to assess the health condition of the bolted connection. In this embodiment, an impact device, such as a hammer with a metal tip, is utilized to apply one or more taps to a portion of the bolted structure, such as a corner of the nut. The sound generated by the bolted structure is recorded on a suitable recording device, such as the "voice record" function of a smart phone. Signal features are preferably extracted from the recorded signals. In a preferred embodiment, power spectrum density (PSD), with selected frequency ranges, is used as a signal feature to recognize and classify the recorded acoustical tapping data. The frequency details of the features in this preferred embodiment are listed in Table 1 below. For each feature, the total energy of each PSD segment is computed by the summation of the PSD sampling values at the corresponding frequency range.

TABLE 1

| Feature name | Frequency |
| --- | --- |
| Feature (0) | 200-300 Hz |
| Feature (1) | 300-400 Hz |
| Feature (2) | 400-500 Hz |
| Feature (3) | 500-600 Hz |

In preferred embodiments, to identify the level of bolt looseness, a simple machine learning model using a decision tree method is adopted. A decision tree is a type of machine learning model that arrives at a final output based on a series of decisions made from multiple conditions. The decision tree may be visualized as an algorithm containing conditional if-then statements. In preferred embodiments, a portion of test results collected from different bolt looseness values may be used as training data to build the decision tree model. The remaining portion of the data may be used to verify the model accuracy.

Preferred embodiments described herein relate to a method for monitoring the tightness of a bolted connection. In initial steps of the method, a decision tree model is developed. The method may include using an impact device, such as a hammer, to apply at least one percussive tap to a portion of multiple bolted connections, wherein each bolted connection has a known tightness, to produce an acoustic signal for these known bolted connections. The acoustic signals for these known bolted connections are then recorded on a recording device to produce acoustic data corresponding to a variety of known bolt tightnesses. Features from the acoustic data are extracted, where the features are correlated with the known tightness of each bolted connection. The features and known tightness of each bolted connection are then used to generate a decision tree model for predicting tightness of a bolted connection using an acoustic signal. Once the decision tree model has been generated, further steps in the method may include using the decision tree model to predict tightness for a bolted connection having an unknown tightness. In these steps, the impact device is used again to apply at least one percussive tap to a portion of the bolted connection having an unknown tightness to produce an acoustic signal. A recording device records the acoustic signal for the unknown bolted connection to produce unknown acoustic data. The same features are extracted from the unknown acoustic data and the decision tree model is used to predict the tightness of the unknown bolted connection.

Additional preferred embodiments include a method for validating the decision tree model, optionally before it is used on an unknown bolted connection. In these steps, the impact device is used to apply at least one percussive tap to a series of bolted connections having known tightnesses. Acoustic signals are recorded by a recording device to produce acoustic data, and the features used in the decision tree model are extracted from the acoustic data. The decision tree model is then used to predict the tightness of the bolted connections. The tightness of the bolted connections as predicted by the decision tree model is then compared to the actual known tightness of these bolted connections in order to validate the decision tree model.

Additional preferred embodiments relate to a system for monitoring the tightness of a bolted connection, which includes an impact device. The impact device may be positioned to apply at least one percussive tap to a portion of a bolted connection, to produce an acoustic signal for the unknown bolted connection. The system also includes a recording device capable of recording the acoustic signal for the bolted connection to produce acoustic data. The system also includes a process in communication with the recording device. Any suitable processor can be used. The processor is programmed with a decision tree model for predicting tightness of a bolted connection based on features extracted from acoustic data, and is also programmed to extract these features from the acoustic data that is recorded and to predict tightness of the bolted connection.

In further preferred embodiments, the impact device is a hammer. In preferred embodiments, the extracted features are power spectrum density (PSD) at selected frequency ranges, preferably the selected frequency ranges of 200-300 Hz, 300-400 Hz, 400-500 Hz, and 500-600 Hz.

EXAMPLE

Figure 2A:
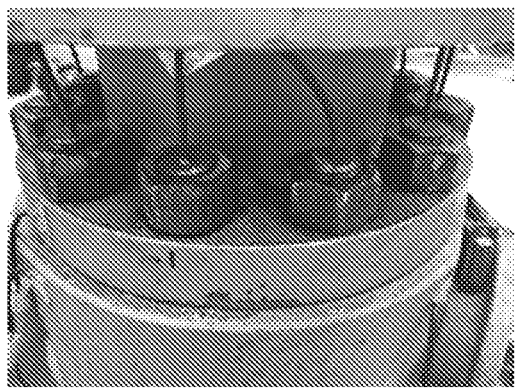
FIG. 2A shows an image of a subsea flange used in an experimental analysis.
Figure 2B:
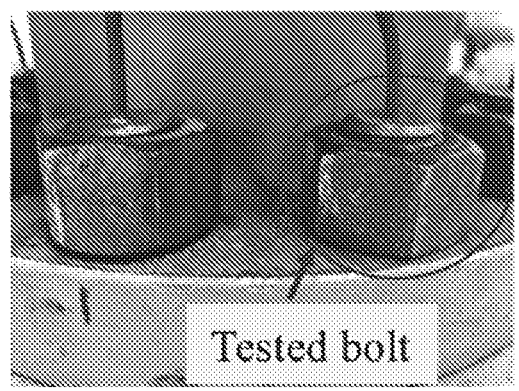
FIG. 2B shows an image of a selection of one bolt from a flange used in an experimental analysis.
Figure 2C:
FIG. 2C shows an image of sound recordings being taken from a selected bolt in a flange in an experimental analysis.

The specimen used in this example was a 12-bolt subsea flange recovered from the field, as shown in FIG. 2A. One bolt from the flange was selected as the test sample, as shown in FIG. 2B. Five different looseness conditions of the bolt from fully loosened (0 lb.ft) to 80 lb.ft with 20 lb.ft increment were demarcated. For each looseness condition, the bolt was impacted 50 times. The smart phone was fixed at a pre-determined location and recorded the impact-induced sound from the bolt, as shown in FIG. 2C. The sampling rate of the signal was 48000 Hz.

Figure 3:
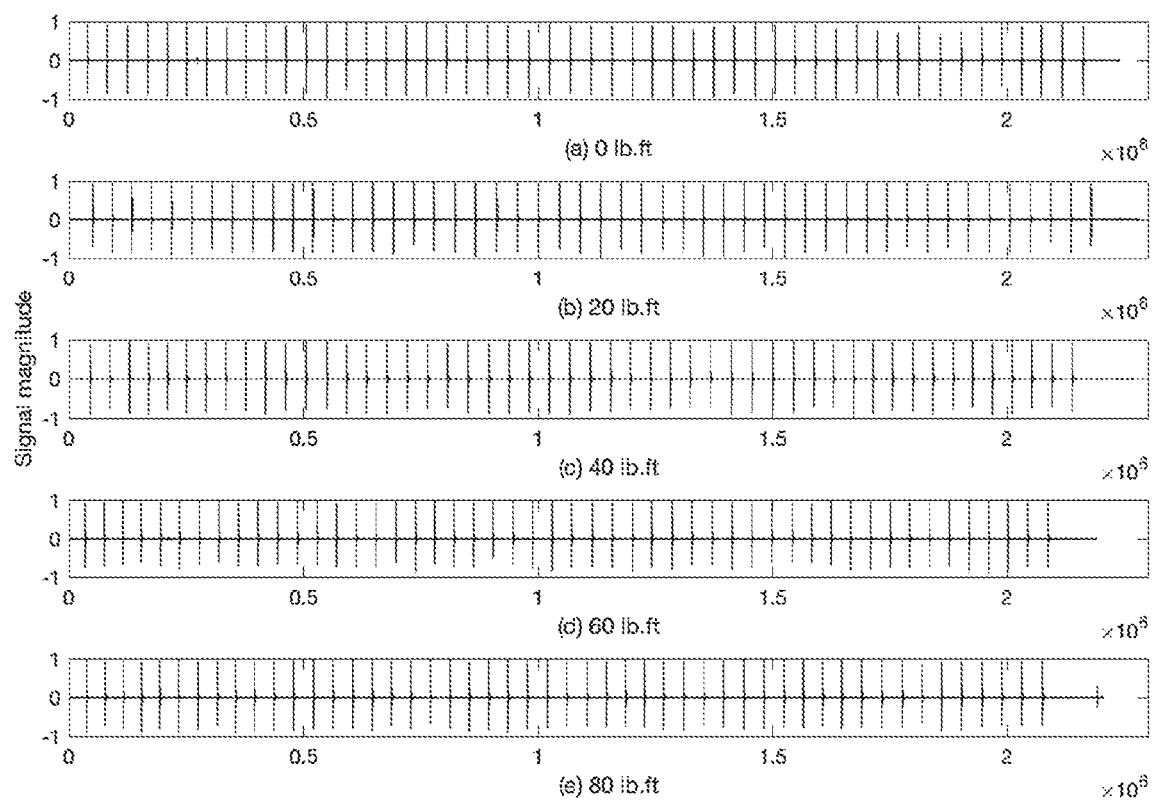
FIG. 3 shows impact-induced sound signals recorded by a smart phone in an experimental analysis at a bolt looseness of (a) 0 lb.ft, (b) 20 lb.ft, (c) 40 lb.ft. (d), 60 lb.ft, and (e) 80 lb.ft.

The impact-induced sound signals recorded by the smart phone are shown in FIG. 3(a)-3(e), for each 20 lb.ft increment of bolt looseness from FIG. 3(a) 0 lb.ft to FIG. 3(e) 80 lb.ft. The 50 peaks on each plot represent the 50 hammer impacts. Due to the innate randomness resulting from manually controlled impacts, the magnitudes of the peaks are not uniform.

Figure 4A:
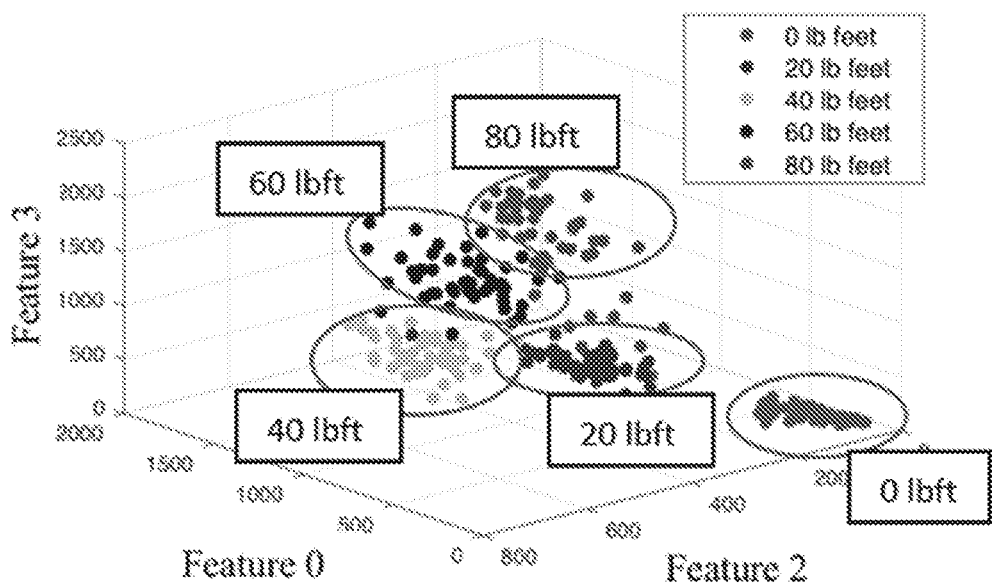
FIG. 4A shows 3D scatterplots for different bolt looseness conditions as determined by extracted Features 0, 2, 3.
Figure 4B:
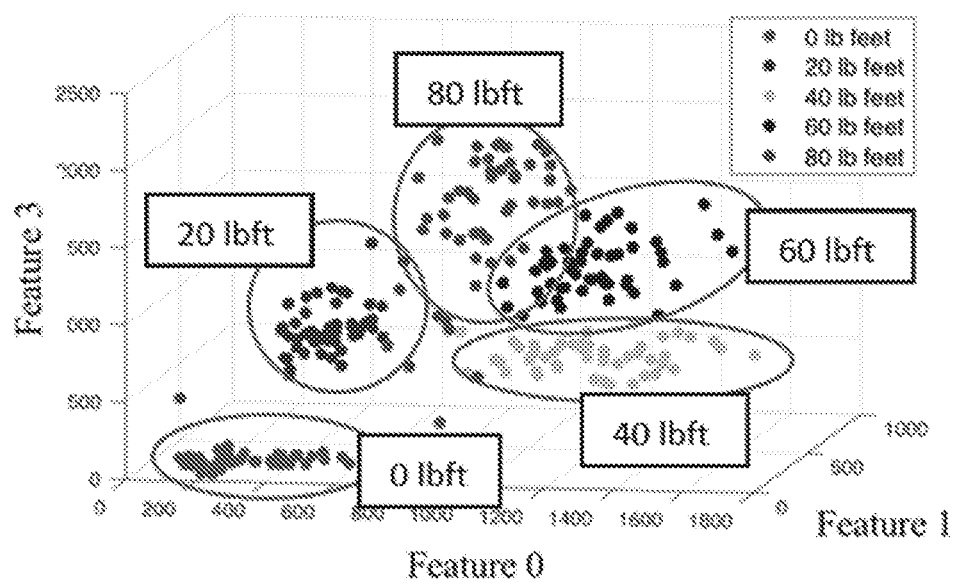
FIG. 4B shows 3D scatterplots for different bolt looseness conditions as determined by extracted Features 0, 1, 3.

Four features were selected based on the summation of energy from four frequency bands of the data's PSD plot. FIG. 4A presents the 3D scatterplots for different bolt looseness conditions as determined by Features 0, 2, 3 and FIG. 4B shows the 3D scatterplots for different bolt looseness conditions as determined by Features 0, 1, 3. The figures suggest that the torque level of the bolt can be distinguished based on the combination of the selected features. Different bolt looseness levels can be clearly distinguished from the 3D scatterplots of the signal features extracted from the 200-600 Hz frequency range. However, the results also suggest that the correlation between features and the bolt looseness is nonlinear and this complicates the finding of a trend between feature values and bolt looseness.

Figure 5:
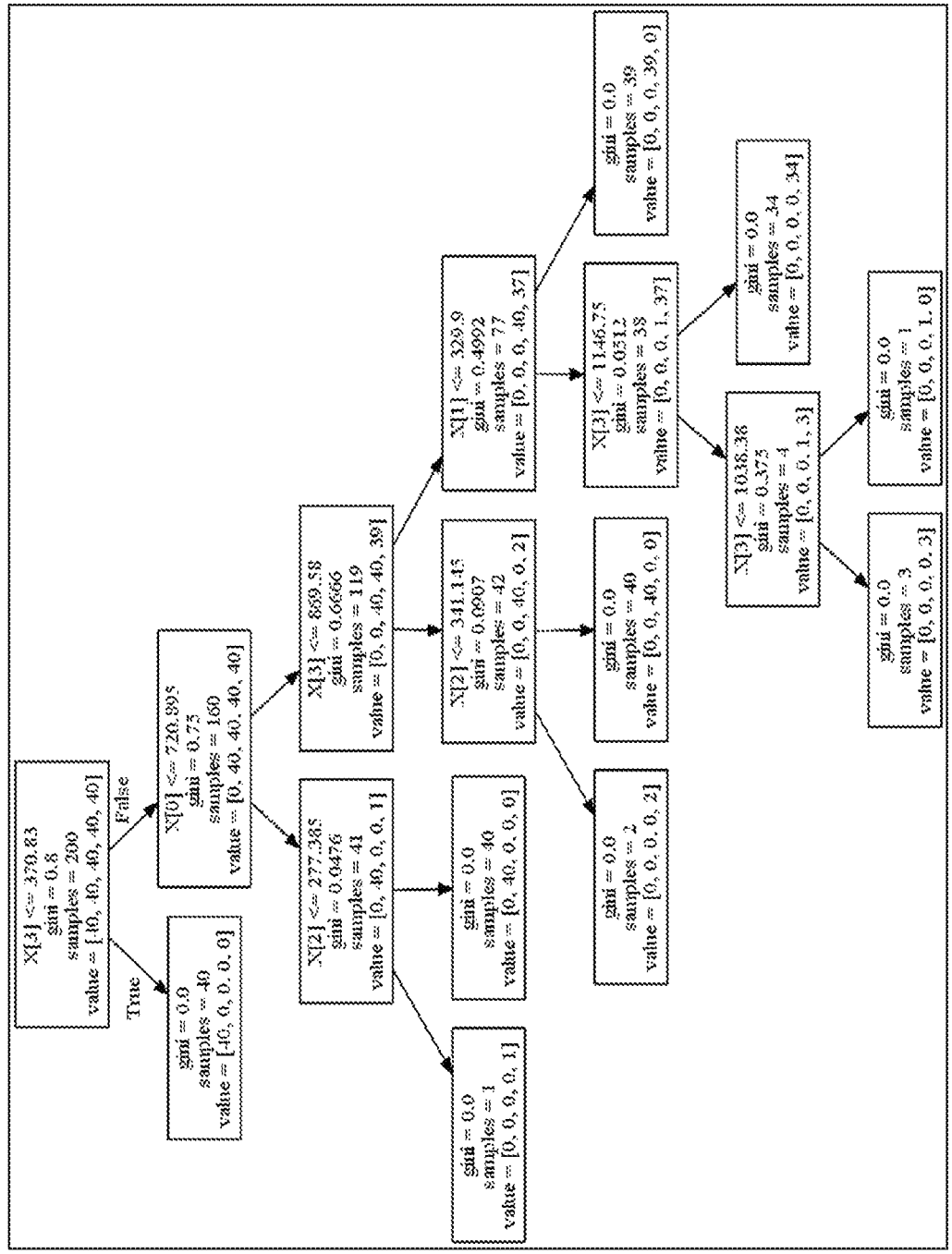
FIG. 5 shows an exemplary decision tree model for identifying bolt looseness from acquired impact data, in accordance with preferred embodiments described herein.

In order to overcome the nonlinearity in the correlation, the decision tree method was utilized to further identify the bolt looseness from acquired impact data. For each torque level, 40 randomly selected data points from 50 impact signals were used to build a decision tree model, as shown in FIG. 5. The remaining 10 impact signals were used to test the feasibility and accuracy of the model. Therefore, a total of 200 impacts signals for all the torque level conditions were used for as training data and the remaining 50 signals were used as test data. This process was repeated 100 times, and the accuracy percentage of the test data for each time was calculated, as shown in FIG. 6. The average accuracy percentage of the test data was 96.94% for the process repeated 100 times. Thus, the decision tree model developed by the training data could accurately identify the bolt looseness condition for the test data.

REFERENCES

The following documents and publications are hereby incorporated by reference.
U.S. Pat. No. 6,962,082
U.S. Patent Pub. No. 2010/0089161
May, D. B. and Munt, P. W., 1979. Physiologic effects of chest percussion and postural drainage in patients with stable chronic bronchitis. *Chest*, 75(1), pp. 29-32.
Gallon, A., 1991. Evaluation of chest percussion in the treatment of patients with copious sputum production. *Respiratory medicine*, 85(1), pp. 45-51.
McGee. S. R., 1995. Percussion and physical diagnosis: separating myth from science. *Disease-a-Month*, 41(10), pp. 645-692.
Kaewunruen, S. and Remennikov, A. M., 2007. Field trials for dynamic characteristics of railway track and its components using impact excitation technique. *Ndt & E International*, 40(7), pp. 510-519.
Sohn, H. and Farrar, C. R., 2001. Damage diagnosis using time series analysis of vibration signals. *Smart materials and structures*, 10(3), p. 446.
Deraemaeker, A., Reynders, E., De Roeck. G. and Kullaa, J., 2008. Vibration-based structural health monitoring using output-only measurements under changing environment. *Mechanical systems and signal processing*. 22(1), pp. 34-56.
Giurgiutiu, V., Zagrai, A. and Jing Bao. J., 2002. Piezoelectric wafer embedded active sensors for aging aircraft structural health monitoring. *Structural Health Monitoring*, 1(1), pp. 41-61.
Staszewski, W. J., Lee, B. C., Mallet, L. and Scarpa, F., 2004. Structural health monitoring using scanning laser vibrometry: I. Lamb wave sensing. *Smart Materials and Structures*, 13(2), p. 251.
Li, R. and He, D., 2012. Rotational machine health monitoring and fault detection using EMD-based acoustic emission feature quantification. *IEEE Transactions on Instrumentation and Measurement*, 61(4), pp. 990-1001.
Safavian, S. R. and Landgrebe. D., 1991. A survey of decision tree classifier methodology. *IEEE transactions on systems, man, and cybernetics*, 21(3), pp. 660-674.

What is claimed is:

1. A method for monitoring the tightness of a bolted connection, comprising:
using an impact device to apply at least one percussive tap to a portion of a plurality of known bolted connections, wherein each known bolted connection has a known tightness, to produce a model acoustic signal for each known bolted connection;
recording the model acoustic signals using a recording device to produce model acoustic data;
extracting features from the model acoustic data wherein the features are correlated with the known tightness of each known bolted connection;
using the features and the known tightness of each known bolted connection to generate a decision tree model for predicting tightness of a bolted connection using an acoustic signal;
using the impact device to apply at least one percussive tap to a portion of an unknown bolted connection having an unknown tightness to produce an unknown acoustic signal for the unknown bolted connection;
recording the unknown acoustic signal for the unknown bolted connection using a recording device to produce unknown acoustic data;
extracting the features from the unknown acoustic data;
using the decision tree model to predict the tightness of the unknown bolted connection using the features extracted from the unknown acoustic data;
using the impact device to apply at least one percussive tap to a portion of a plurality of test bolted connections, wherein each test bolted connection has an known tightness, to produce a test acoustic signal for each test bolted connection;
recording the test acoustic signals using a recording device to produce test acoustic data;
extracting features from the test acoustic data;
using the decision tree model to predict the tightness of the test bolted connections using the features extracted from the test acoustic data; and
comparing the tightness of the test bolted connections predicted by the decision tree model to the known tightness of the test bolted connections in order to validate the decision tree model.

2. The method of claim 1, wherein the impact device is a hammer.

3. The method of claim 1, wherein the features are power spectrum density (PSD) at selected frequency ranges.

4. The method of claim 3, wherein the selected frequency ranges are 200-300 Hz, 300-400 Hz, 400-500 Hz, and 500-600 Hz.

* * * * *